United States Patent Office 2,778,827
Patented Jan. 22, 1957

2,778,827

PROCESS FOR THE MANUFACTURE OF DERIVATIVES OF 4:4'-DIAMINOSTILBENE-2:2'-DISULFONIC ACID

Franz Ackermann, Binningen, Switzerland, assignor to Ciba Limited, Basel, Switzerland, a Swiss firm No Drawing. Application October 11, 1950,
Serial No. 189,682

Claims priority, application Switzerland October 28, 1949

9 Claims. (Cl. 260—249.6)

This invention provides new derivatives of 4:4'-diaminostilbene-2:2'-disulphonic acid of the general formula

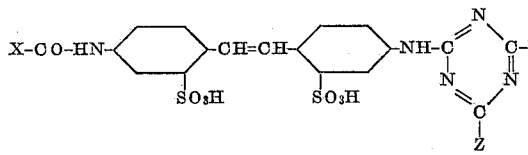

in which X represents an aromatic or heterocyclic residue, which may contain substituents, Y represents —NH₂ or the residue of a primary or secondary amine or an organic residue bound to the carbon atom of the triazine ring by an —O— or —S— bridge, and Z represents a chlorine or bromine atom or a substituent of the kind represented by Y (with the exception of those derivatives in which Z represents a chlorine atom and Y represents the residue of an aromatic amine, when X represents an aromatic residue), or salts of such derivatives.

The invention also includes a process for the manufacture of the foregoing derivatives or salts thereof wherein either (A) 1 mol of cyanuric chloride or cyanuric bromide is reacted in either order of succession with (a) 1 mol of 4-nitro-4'-aminostilbene-2:2'-disulphonic acid or a water-soluble salt thereof and (b) 1 or 2 mols of ammonia or 1 or 2 mols of a primary or secondary amine or an aliphatic, aromatic, araliphatic, hydroaromatic or heterocyclic hydroxy- or mercapto-compound, the nitro group in the resulting condensation product is reduced to an amino group, and the reduction product is acylated with an aromatic or heterocyclic carboxylic acid, which may contain substituents, or (B) 1 mol of 4-amino-4'-nitro-stilbene-2:2'-disulphonic acid or a water-soluble salt thereof is first acylated with an aromatic or heterocyclic carboxylic acid, which may contain substituents, then the nitro group in the resulting condensation product is reduced to an amino group, and 1 mol of cyanuric chloride or cyanuric bromide is reacted in either order of succession with (a) 1 mol of the resulting amino-compound and (b) with 1 or 2 mols of a compound specified under (b) above, and wherein the reacting components are so chosen as to exclude the production of derivatives or salts in which Z represents a chlorine atom, Y represents the residue of an aromatic amine, when X represents an aromatic residue.

The new compounds of the above formula and also their water-soluble salts do not possess the character of dyestuffs but depending on their constitution have a more or less pronounced affinity for a very wide variety of substrata, such as vegetable and animal fibres. On such substrata they exhibit in ultra-violet light a blue to violet fluorescence.

By virtue of these properties the products are capable of enhancing the white content of undyed materials and improving the purity of colour of dyed materials.

The primary or secondary amines used as starting materials may belong to the aliphatic, aromatic, hydroaromatic, araliphatic or heterocyclic series. Among the aliphatic amines which come into consideration such as mono-alkylamines, di-alkylamines, mono-(hydroxyalkyl)-amines and bis-(hydroxy-alkyl)-amines there may be used those which contain, for example, 1–18 carbon atoms. Especially suitable are the compounds of low molecular weight which contain a carbon chain having, for example, 1–4 carbon atoms. There may be mentioned monoethanolamine, diethanolamine, propanolamines, and also methylamine, ethylamine, propylamine, butylamine, dimethylamine, dipropylamine, dibutylamine, and furthermore amines having a branched chain such as isopropylamine, isobutylamine, di-isobutylamine and unsaturated amines such as allyl amine.

Among the aryl amines coming into consideration there may be mentioned above all phenylamines, which may contain as a substituent an alkyl or —O— alkyl group or halogen, such as aniline, parachlor-aniline, paramethoxy-aniline or toluidine.

Among the heterocyclic amines coming into consideration there may be mentioned pipecolines, pyrrolidine, tetrahydroquinoline, 2-aminothiazole, 5-aminotetrazole and above all morpholine.

As aliphatic hydroxy- or mercapto-compounds for use in the present invention there come into consideration among others, aliphatic alcohols and mercaptans containing, for example, 1–10 carbon atoms, which may contain in addition to the hydroxyl or mercapto group further substituents, such as halogen atoms, carboxyl or sulphonic acid groups or poly-ether residues. However, especially suitable are the lower members of this series containing 1–6 carbon atoms, such, for example, as methyl alcohol, ethyl alcohol, propyl alcohol, isopropyl alcohol, allyl alcohol, butyl alcohol, secondary butyl alcohol, tertiary butyl alcohol, hexyl alcohol, 2-ethyl butanol, oxyethane sulphonic acid, allyl mercaptan, amyl mercaptan, thioglycollic acid or thioethylene glycol. The aromatic members of this class of compounds may be derived from any desired aromatic compounds, but above all from benzene or naphthalene.

In addition to the hydroxyl or mercapto group, they may, if desired, contain further substituents such as halogen atoms, alkyl groups, etherified hydroxyl groups, acylated or dialkylated amino groups, or carboxylic acid or sulphonic acid groups. There may be mentioned phenol, ortho-, meta-, or para-chlorophenol, 2:4-dichlorophenol, ortho-, meta- or para-cresol, halogenated cresols, parabromophenol, naphthols, para-tertiary butyl-phenol, salicylic acid, para-oxybenzoic acid, phenol sulphonic acids, thymol, guaiacol, thiophenol and substitution products thereof. Among the araliphatic compounds of this kind there come into consideration above all benzyl alcohol and its nuclear substitution products such as paratolyl-carbinol, 2-oxy-1:2-dimethyl-4-isopropyl-cymene, and also tetrahydronaphthyl-carbinols such as ar-tetrahydro-α- or ar-tetrahydro-β-naphthyl-carbinol or mixtures of these compounds. As examples of the heterocyclic series used as starting materials there may be mentioned oxyquinoline, 2-oxybenzthiazole or 2-mercaptobenzthiazole.

As aromatic carboxylic acids there come into consideration for the present invention above all those of the benzene and naphthalene series, which may contain further nuclear substituents such as halogen atoms, lower alkyl groups or lower alkoxy groups. There may be mentioned benzoic acid, para-chlorobenzoic acid, para-methoxybenzoic acid, ortho-bromobenzoic acid, 2:4-dichlorobenzoic acid and naphthoic acid. Among the heterocyclic carboxylic acids there may be mentioned above all 2-furane-carboxylic acid and 2-thiophene carboxylic acid.

As salts of the derivatives of this invention there come into consideration above all their water-soluble salts, for example, the salts with ammonia or amines, but advantageously the alkali metal salts.

The reaction of cyanuric chloride or cyanuric bromide with 4-nitro-4'-aminostilbene-2:2'-disulphonic acid and with an amine or hydroxyl or mercapto compound mentioned under (b) may be carried out by general methods known for reacting such compounds, for example, in the presence of water or of mixtures of water with organic solvents, such as acetone, and if desired in the presence of buffers or acid-binding agents, such as sodium acetate or alkali carbonates or alkali hydroxides. Advantageously there is used instead of the free 4-nitro-4'-aminostilbene-2:2'-disulphonic acid a water-soluble salt thereof for the reaction with cyanuric chloride or cyanuric bromide. Similarly it is of advantage to use as starting materials, instead of the free hydroxy- or mercapto compounds, their alkali compounds.

The reaction of aromatic or heterocyclic carboxylic acids with 4-amino-4'-nitro-stilbene-2:2'-disulphonic acid or with the unilaterally substituted intermediate products may be carried out by methods usual for such reactions. Advantageously there are used instead of the carboxylic acids their reactive derivatives, such as their anhydrides or halides. The carboxylic acids and their reactive derivatives may be designated as acylating agents capable of introducing the radical of a carboxylic acid. The reduction of the 4-nitro-4'-amino-stilbene disulphonic acid substituted in the amino group and obtained as an intermediate product may be carried out in the usual manner, for example, by reduction with iron in the presence of acid. Among the compounds of the foregoing general formula and obtainable by the process described above there may be mentioned the following:

Compounds of the general formula

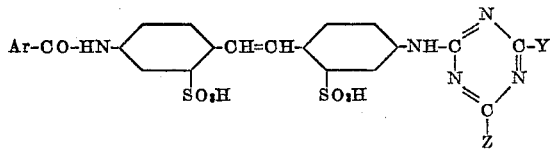

in which Ar represents an aromatic residue which may contain substituents, Y represents —NH₂ or the residue of a primary or secondary amine or an organic residue bound to the carbon atom of the triazine ring by an —O— or —S— bridge, and Z represents a chlorine or bromine atom or a substituent of the kind represented by Y (with the exception of those derivatives in which Z represents a chlorine atom and y represents the residue of an aromatic amine), or salts of such derivatives.

Such compounds are, for example, those of the formula

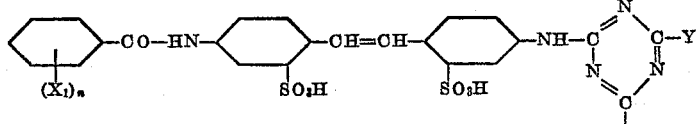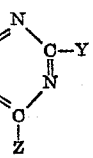

in which X₁ represents a chlorine or bromine atom, a lower alkyl or —O-alkyl or an acylated amino group, and n represents zero or the whole number 1 or 2, and Y and Z have the meanings given above.

Examples of such compounds are 4-[(para-methoxybenzoyl) - amino] - 4' - [2 - methylamino - 4 - (β - hydroxyethylamino) - 1:3:5 - triazyl - (6) - amino] - stilbene-2:2'-disulphonic acid of the formula

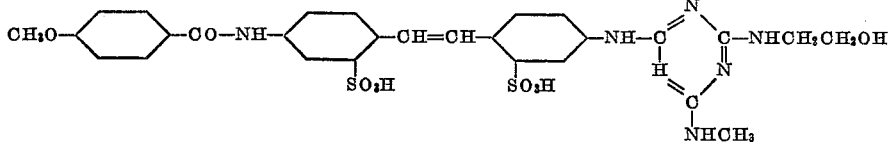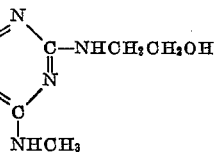

and homologues thereof in which the para-methoxybenzoyl residue is replaced by an unsubstituted benzoyl residue or by an ortho-methoxy- para-chloro-, ortho-bromo-, ortho:para-dichloro-, para-methyl-, para-isopropyl- or para-tertiary-butyl-benzoyl residue, and also 4-[(para - methoxy - benzoyl) - amino] - 4' - [2 - chloro-4 - bis - (β - hydroxyethyl) - amino - 1:3:5 - triazyl-(6) - amino] - stilbene - 2:2' - disulphonic acid, 4-[(p - chlorobenzoyl) - amino] - 4' - [2 - phenoxy - 4-methylamino-1:3:5-triazyl-(6)-amino]-stilbene-2:2'-disulphonic acid, 4-[(ortho:paradichlorbenzoyl)-amino]-4'-[2 - (β - hydroxyethyl) - thio - 4 - ethylamino - 1:3:5-triazyl - (6) - amino] - stilbene - 2:2' - disulphonic acid and 4 - [(p - methoxy - benzoyl) - amino] - 4' - [2:4-di - (β - hydroxyethyl) - amino - 1:3:5 - triazyl - (6)-amino] - stilbene - 2:2' - disulphonic acid, further 4-[(ortho - methoxy - benzoyl) - amino] - 4' - [2 - (ortho-anisidino) - 4 - ethylamino - 1:3:5 - triazyl - (6) - amino]-stilbene - 2:2' - disulphonic acid, 4 - [(para - methoxybenzoyl) - amino] - 4' - [2 - phenyl - thio - 4 - ethylamino-1:3:5 - triazyl - (6) - amino] - stilbene - 2:2' - disulphonic acid, 4 - [(ortho - methoxy - benzoyl) - amino] - 4'-[2 - morpholino - 4 - ethylamino - 1:3:5 - triazyl - (6)-amino]-stilbene-2:2'-disulphonic acid.

Among the compounds of the kind first mentioned above there are also those of the general formula

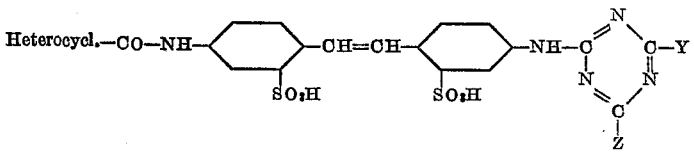

in which Heterocycl. represents a heterocyclic residue which may contain substituents, Y represents NH₂ or an amino group in which at least one hydrogen atom is replaced by an alkyl, oxyalkyl, aryl or heterocyclic residue, or an organic residue bound to the carbon atom of the triazine ring by an —O— or —S— bridge, and Z represents a chlorine or bromine atom or a substituent of the kind represented by Y.

Among these compounds there may be mentioned 4 - [(2 - furoyl) - amino] - 4' - [2 - (ortho - anisidino)-4-ethylamino - 1:3:5 - triazyl - (6) - amino] - stilbene - 2:2'-disulphonic acid and 4 - [thenoyl - (2) - amino] - 4' - [2-(ortho - anisidino) - 4 - (ortho - chloranilino) - 1:3:5-triazyl - (6) - amino] - stilbene - 2:2' - disulphonic acid.

The new products obtainable by the invention may be used by impregnating the material to be improved with a solution, especially an aqueous solution, of the compound in question, and drying the material after centrifuging or squeezing it. For example, white goods may be after-treated with a product of the invention, more especially after being laundered in the usual manner. Furthermore, the new products can be used for after-treating printed cellulose materials.

The compounds obtainable by the invention can also be used in the course of manufacture of the materials to be improved, for example, by adding them to a paper pulp.

In general small quantities of the products of the invention are sufficient for producing the improvement.

The compounds of the invention may also be used in admixture with auxiliary substances such as are used for improving fibrous materials, for example, together with washing agents, for example, together with soaps, salts of sulphonated washing agents such, for example, as sulphonated benzimidazoles containing a higher alkyl residue as a substituent at the 2-carbon atom, and also monocarboxylic acid esters of 4-sulphophthalic acid with higher fatty alcohols, and furthermore together with fatty alcohol sulphonates or condensation products of higher fatty acids with aliphatic oxy- or amino-sulphonic acids. In this way the materials to be improved may be simultaneously washed and bleached.

As materials which can be improved by the process of the invention there may be mentioned for example: Nitrogenous natural or artificial materials such as wool, silk or synthetic polyamide fibres; cellulose materials such as cellulose itself, paper, and textile materials of cotton, linen, or of regenerated cellulose including stable fibres of regenerated cellulose; and finally synthetic materials produced, for example, by polymerisation. However, the best effects are obtained by the present process on vegetable and animal fibres. The material to be improved may be in any desired form, for example, in the form of fibres or films. Moreover, the material may, for example, be undyed, dyed or printed.

The following examples illustrate the invention, the parts being by weight:

*Example 1*

A solution of 20 parts of cyanuric chloride in 100 parts of acetone is stirred with 100 parts of ice and 100 parts of water, and a solution neutralised with sodium hydroxide of 47.6 parts of 4-nitro-4'-aminostilbene-2:2'-disulphonic acid (84 percent strength) in 400 parts of water is introduced dropwise into the resulting suspension at 0-5° C. in the course of 10 minutes. A solution of 5.5 parts of sodium carbonate in 50 parts of water is run into the resulting reaction mixture in the course of about 1 hour in such manner that the reaction mass remains weakly acid to neutral throughout. 8 parts of an aqueous solution of 40 percent strength of monomethylamine are added to the neutral reaction mixture containing no more starting material, the temperature is raised to 35° C. in the course of about 1 hour, and the whole is maintained at this temperature for 3 hours. The hydrochloric acid formed is neutralised by slowly adding a solution of 5.5 parts of sodium carbonate in 50 parts of water. After the addition of 20 parts of monoethanolamine, the temperature is raised to 80° C., and the whole is stirred at that temperature for about 6 hours. The resulting condensation product is then precipitated by means of a salting out agent, for example, sodium chloride, and the precipitate is separated by filtration and washed until neutral with sodium chloride solution. The product obtained in this manner is then introduced in the course of about 1 hour at 90-100° C. into a reduction mixture consisting of 500 parts of water, 15 parts of glacial acetic acid and 66 parts of iron. As soon as the nitro-compound has disappeared, the whole is rendered alkaline with sodium carbonate and filtered. The resulting 4-amino-4'-[2-methylamino - 4 - β - hydroxyethylamino - 1:3:5 - triazyl - (6)-amino] - stilbene - 2:2' - disulphonic acid is precipitated by means of dilute hydrochloric acid, separated by filtration, washed free from hydrochloric acid with water and dried.

5.4 parts of the product so obtained are stirred with 50 parts of water, and neutralised with sodium carbonate. To the resulting solution are added 50 parts of acetone and a sufficient quantity of sodium carbonate to produce a distinctly alkaline reaction. The reaction mass is then cooled to 10-15° C. and a solution of 3 parts of anisoylchloride dissolved in 6 parts of acetone are added dropwise in the course of 1 hour while keeping the reaction alkaline throughout. As soon as the starting material has disappeared, the acetone is distilled off at a low temperature in vacuo, and the resulting condensation product is precipitated by means of a salting out agent for example, sodium chloride, separated by filtration, washed with sodium chloride solution and dried.

The resulting disodium salt of 4-[(paramethoxybenzoyl)] - amino - 4' - [2 - methylamino - 4 - β - hydroxyethylamino - 1:3:5 - triazyl - (6) - amino] - stilbene-2:2' - disulphonic acid of the formula

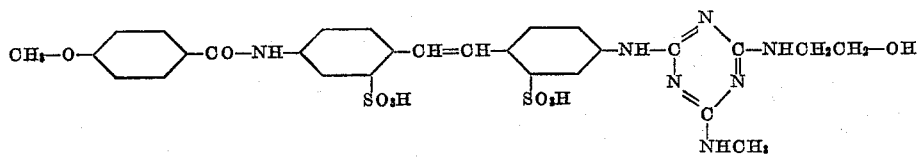

is a pale yellow powder which is soluble in water. Cotton, which has been treated with a solution of the above compound, has a brighter appearance than cotton treated without such addition.

By using in this example, instead of 3 parts of anisoyl chloride, 3 parts of 2-methoxy-benzoyl chloride, 3 parts of 4-methyl-benzoyl chloride or 2 parts of benzoyl chloride, or instead of 4 - amino - 4' - [2 - methylamino - 4 - (β - hydroxyethylamino) - 1:3:5 - triazyl- (6) - amino] - stilbene - 2:2' - disulphonic acid, an equivalent quantity of 4 - amino - 4' - [2:4 - diamino- 1:3:5 - triazyl - (6) - amino] - stilbene - 2:2' - disulphonic acid, or of 4 - amino - 4 - [2:4 - di - ethylamino - 1:3:5- triazyl - (6) - amino] - stilbene - 2:2' - disulfonic acid, there are obtained products having similar properties.

*Example 2*

A solution of 20 parts of 4-methoxybenzoylchloride in 40 parts of acetone is introduced dropwise in the course of about 1 hour into a solution, rendered alkaline with sodium carbonate, of 47.6 parts of 4-amino-4'-nitrostilbene-2:2'-disulphonic acid (84 percent strength) in 300 parts of water and 300 parts of acetone at 10-15° C. As soon as the starting material has disappeared, sodium chloride solution is added, the precipitated condensation product is separated by filtration, washed with sodium chloride solution and reduced in a manner analogous to that described in Example 1 by introducing the product into a reduction mixture consisting of 500 parts of water, 30 parts of glacial acetic acid and 66 parts of iron. The reduction mixture is rendered alkaline with sodium carbonate, the disodium salt of the resulting 4-[(para-methoxybenzoyl) - amino] - 4' - aminostilbene - 2:2' - disulphonic acid is precipitated with sodium chloride, separated by filtration, washed with sodium chloride solution and dried.

5.5 parts of the resulting product are dissolved in 100 parts of water and introduced dropwise at 0-5° C. into a fine suspension obtained by introducing 2 parts of cyanuric chloride dissolved in 10 parts of acetone into a mixture consisting of 20 parts of ice and 20 parts of water, the reaction mixture being maintained weakly acid to neutral by the gradual addition of 0.5 part of sodium carbonate dissolved in 5 parts of water. As soon as the starting material has disappeared 3 parts of diethanolamine are added, the temperature is raised to 40° C. in the course of 1 hour, and the whole is maintained at that temperature for 5 hours. The resulting disodium salt of 4 - [(para-methoxybenzoyl) - amino] - 4' - [2 - chloro- 4 - (bis - β - hydroxyethyl) - amino - 1:3:5 - triazyl - (6) - amino] - stilbene - 2:2' - disulphonic acid of the formula

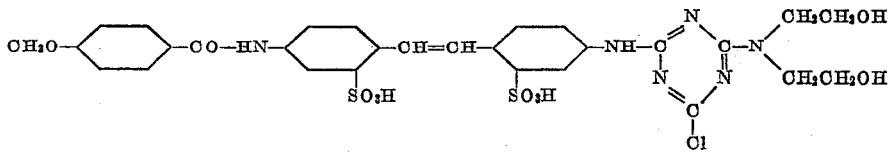

is then precipitated with sodium chloride, separated by filtration, and washed with aqueous sodium chloride solution and dried. It is a pale yellow powder which is soluble in water. Cellulose material, which has been treated with a solution of this compound, exhibits a bluish fluorescence in ultraviolet light.

By using in this example instead of 20 parts of 4-methoxybenzoyl chloride 20 parts of 2-methoxybenzoyl chloride there is obtained a product having similar properties. Products having similar properties are also obtained by using, instead of 3 parts of diethanolamine, an equivalent quantity of monoethanolamine, methylamine, N':N'-diethyl - ethylene - diamine or dimethylamine.

Example 3

1.88 parts of phenol are added to 14 parts of the disodium salt of 4-[(para-methoxybenzoyl)-amino]-4'-[2:4 - dichloro - 1:3:5 - triazyl - (6) - amino] -stilbene- 2:2' - disulphonic acid in water at 10° C., the temperature is raised to 40° C., and the whole is stirred at this temperature for 2 hours, while 20 parts of a normal solution of caustic soda are simultaneously added dropwise in such manner that the reaction mass has a neutral to weakly alkaline reaction. 1.2 parts of monoethanolamine are then added, the reaction temperature is raised to 70° C. in the course of 1 hour, and the whole is stirred for 6 hours at 70–75° C., and the hydrochloric acid formed is continuously neutralised by the addition of a solution of 1.1 parts of sodium carbonate in 11 parts of water. The whole is then allowed to cool, the resulting condensation product is precipitated by the addition of sodium chloride, separated by filtering, washed with sodium chlorde solution, and dried. The resulting compound of the formula

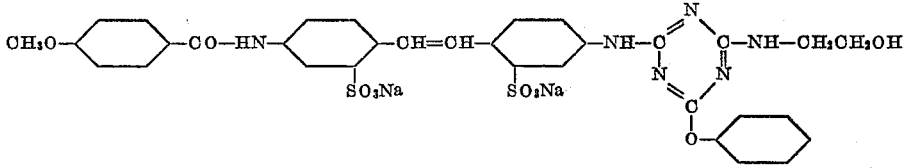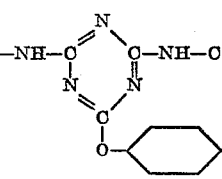

is a pale yellow powder which is soluble in water. When cellulose material is treated with an aqueous solution of this compound the material exhibits a bluish fluorescence in ultraviolet light. By using instead of 1.2 parts of monoethanolamine, an equivalent quantity of methylamine or ethylamine, there is obtained a product having similar properties.

Example 4

A solution of 11 parts of the disodium salt of 4-[(para-methoxybenzoyl) - amino] - 4' - aminostilbene - 2:2'-disulphonic acid in 200 parts of water are added at 0–5° C. to a fine suspension obtained by pouring into ice water 3.8 parts of cyanuric chloride dissolved in acetone, the reaction mixture being maintained weakly acid or neutral throughout by introducing dropwise a solution of 1.1 parts of sodium carbonate in 10 parts of water. As soon as the starting material has disappeared 1.6 parts of an aqueous solution of 40 percent strength of monomethylamine are added, the reaction temperature is raised to 30–35° C. and the whole is maintained at the temperature for 4 hours, and the hydrochloric acid formed is neutralised by the gradual addition of about 1.0 part of sodium carbonate dissolved in 10 parts of water. Then, 2.2 parts of thiophenol are added to the reaction mixture while simultaneously raising the temperature to 70–75° C., and maintaining the mixture neutral to weakly alkaline by the gradual addition of 0.8 part of sodium hydroxide dissolved in 20 parts of water. When the reaction has ceased the whole is allowed to cool, the resulting condensation product is precipitated by the addition of sodium chloride, separated by filtration, washed wtih sodium chloride solution, and dried. The new compound has the formula

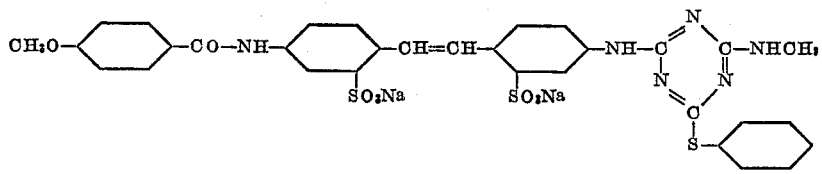

and is a water-soluble powder, solutions of which exhibit a bluish fluorescence in ultraviolet light.

By using, instead of 2.2 parts of thiophenol, an equivalent quantity of 2-mercapto-thiazoline or the sodium salt of thioglycollic acid, products having similar properties are obtained.

Example 5

A solution of 2.5 parts of ortho-methoxy-benzoyl chloride in 10 parts of benzene are run in the course of ½ hour while maintaining a weakly alkaline reaction into a solution neutralised with sodium carbonate of 6.2 parts of 4 - amino - 4' - [2 - (ortho - anisidino) - 4 - ethylamino- 1:3:5 - triazyl - (6) - amino] - stilbene - 2:2'-disulphonic acid (which can be prepared in a manner analogous to that described in Example 1 by condensing 1 mol of cyanuric chloride with 1 mol of 4-nitro-4'-aminostilbene- 2:2'-disulphonic acid, 1 mol of ortho-anisidine and 1 mol of ethylamine followed by reduction) in 60 parts of water at 15–20° C. As soon as the starting material has disappeared, sodium chloride solution is added, the precipitated condensation product is separated by filtration, washed with sodium chloride solution and dried.

The resulting disodium salt of 4 - [(ortho-methoxybenzoyl) - amino] - 4' - [2-(ortho - anisidino) - 4-ethylamino - 1:3:5 - triazyl - (6) - amino] - stilbene - 2:2'-disulphonic acid of the formula

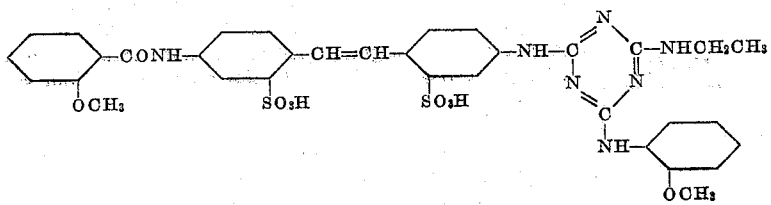

is a bright powder soluble in water.

Cotton which has been treated with a solution of the above product exhibits a brighter appearance than cotton which has been treated without such addition.

By using, instead of ortho-methoxybenzoyl chloride, an equivalent quantity of furane-2-carboxylic acid chloride or, instead of 4 - amino - 4' - [2 - (ortho - anisidino) - 4 - ethylamino - 1:3:5 - triazyl - (6) - amino] - stilbene-2:2' - disulphonic acid, an equivalent quantity of 4-amino - 4' - [2 - (ortho - chloranilino - 4 - methylamino-1:3:5 - triazyl - (6) - amino)] - stilbene - 2:2' - disulphonic acid, or of 4 - amino - 4' - [2:4 - di - morpholino-1:3:5 - triazyl - (6) - amino] - stilbene - 2:2' - disulphonic acid, there are obtained products having similar properties.

*Example 6*

A solution of 1.8 parts of thiophene - 2 - carboxylic acid chloride in 5 parts of benzene are added dropwise in the course of ¾ hour at 15° C. to a solution neutralised with sodium carbonate of 6.5 parts of 4-amino-4'-[2-morpholino - 4 - (ortho - anisidino) - 1:3:5 - triazyl-(6) - amino] - stilbene - 2:2' disulphonic acid (which can be obtained in a manner analogous to that described in Example 1 by condensing 1 mol of cyanuric chloride with 1 mol of 4 - nitro - 4' - aminostilbene - 2:2'-disulphonic acid, 1 mol of morpholine and 1 mol of ortho-anisidine followed by reduction), the hydrochloric acid formed being neutralized by the addition of sodium acetate.

When no more starting material is present, sodium chloride solution is added and the product is worked up in the manner described in the preceding example.

The resulting disodium salt of 4 - [thenoyl - (2)-amino] - 4' - [2 - morpholino - 4 - (ortho - anisidino)-1:3:5 - triazyl - (6) - amino] - stilbene - 2:2' - disulphonic acid of the formula

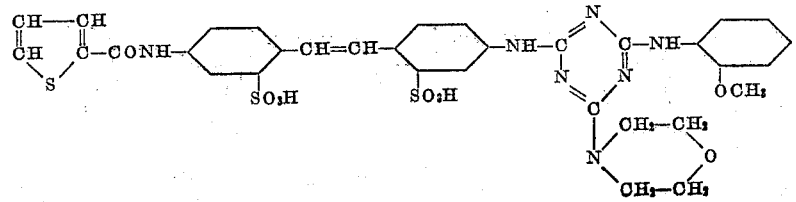

is a slightly yellow-brown powder. Cellulose material which has been treated with an aqueous solution of this product exhibits a bluish fluorescence in ultraviolet light.

By using instead of thiophene-2-carboxylic acid chloride, an equivalent quantity of 5-chloro-thiophene-carboxylic acid chloride there is obtained a product having similar properties.

*Example 7*

A solution of 27 parts of para-nitro-benzoyl chloride in 120 parts of acetone is run in the course of 2 hours at 15–20° C., while stirring into an aqueous solution neutralised with sodium carbonate of 54 parts of 4-amino-4'-[2 - methylamino - 4 - (β - hydroxyethylamino) - 1:3:5-triazyl-(6)-amino]-stilbene-2:2'-disulphonic acid, the reaction mixture being maintained weakly alkaline throughout by the addition of sodium carbonate. When all the starting material has disappeared, sodium chloride solution is added, and the precipitated condensation product is separated by filtration, and washed with sodium chloride solution. The nitro group in the product is then reduced by means of iron and acetic acid as described in Example 1.

The strongly alkaline reduction liquor, after being freed from iron, is mixed with sodium chloride solution and the precipitated reduction product is separated by filtration, washed with sodium chloride solution and dried.

The resulting disodium salt of 4-[(para-aminobenzoyl)-amino] - 4' - [2 - methylamino - 4 - (β - hydroxyethylamino) - 1:3:5 - triazyl - (6) - amino] - stilbene - 2:2'-disulphonic acid of the formula

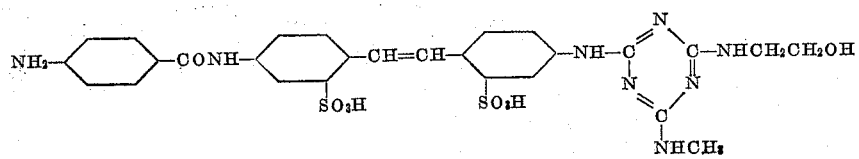

is a pale yellow water-soluble powder.

A solution of 2.3 parts of ortho-methoxy-benzoyl chloride in 8 parts of benzene is added dropwise into a solution of 6.8 parts of the above product in 68 parts of water at 20–25° C. in the course of 30 minutes, while stirring. As soon as the reaction has ceased, sodium chloride solution is added, and the precipitated condensation product is separated by filtration, washed with sodium chloride solution and dried. The resulting disodium salt of 4-[(ortho-methoxybenzoyl para-aminobenzoyl)-amino] - 4' - [2 - methyl - amino - 4 - (β - hydroxyethylamino) - 1:3:5 - triazyl - (6) - amino] - stilbene - 2:2' - disulphonic acid of the formula

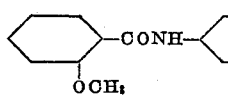

is a water-soluble powder. Cellulose material which has been treated with a solution of the above product exhibits a bluish fluorescence in ultra-violet light.

By using instead of 2.3 parts of ortho-methoxybenzoyl chloride an equivalent quantity of para-methoxybenzoyl chloride or acetyl chloride (in the latter case sodium acetate being used instead of sodium carbonate for binding the hydrochloric acid) there are obtained products having similar properties.

*Example 8*

Cotton is washed at the boil at a liquor ratio of 1:40 in a bath containing 10 grams of a washing preparation of the following composition:

33.3 percent of soap,
11.0 percent of calcined sodium carbonate,
14.0 percent of sodium pyrophosphate,
7.0 percent of sodium perborate,
3.0 percent of magnesium silicate,
0.1 percent of the product obtainable as described in Example 1,
31.6 percent of water
———
100.0 percent The material is then rinsed and dried.

The cotton so treated has a whiter appearance than cotton which has been washed with the same washing preparation but not containing the addition of the product of Example 1.

*Example 9*

An undyed wool fabric is treated at a liquor ratio 1:40 for ½ hour at 40–45° C. in a bath containing, per liter, 0.05 gram of the condensation product obtained as described in Example 2 and 1.125 grams of formic acid. After rinsing and drying, the wool so treated has a higher content of white than the untreated initial material.

*Example 10*

The sodium salt of 2-heptadecyl-N-benzyl-benzimidazyl- disulphonic acid is mixed with 0.05–0.5 percent of the condensation product obtained as described in paragraph 1 of Example 5. An undyed textile material, which has been washed in the usual manner with the aforesaid mixture, exhibits a brighter appearance than textile material which has been washed with the aforesaid sodium salt alone.

What I claim is:

1. An optical bleaching agent which comprises an alkali salt of 4-[(para-methoxy-benzoyl)-amino]-4'-[2-methylamino - 4 - (β - hydroxyethylamino) - 1:3:5 - triazyl-(6)-amino]-stilbene-2:2'-disulphonic acid of the formula

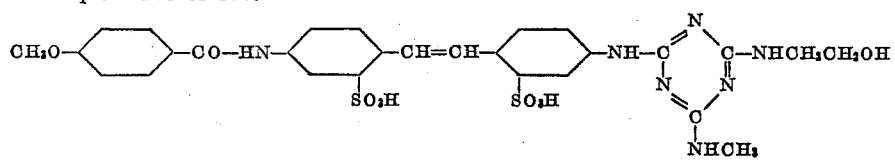
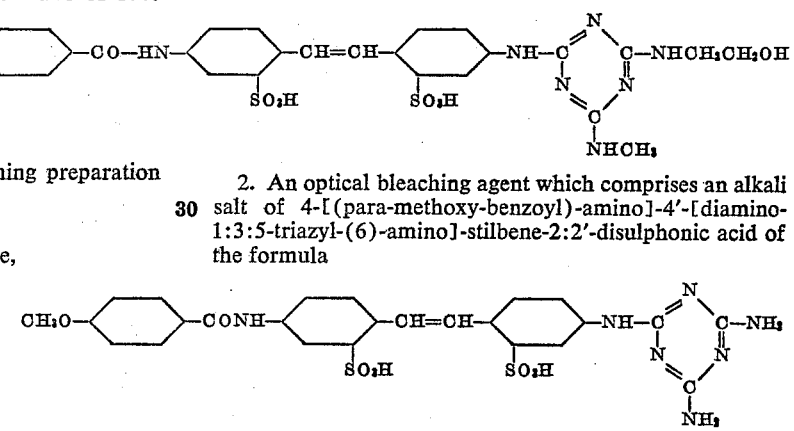

2. An optical bleaching agent which comprises an alkali salt of 4-[(para-methoxy-benzoyl)-amino]-4'-[diamino-1:3:5-triazyl-(6)-amino]-stilbene-2:2'-disulphonic acid of the formula 3. An optical bleaching agent which comprises an alkali salt of 4-[(para-methoxy-benzoyl)-amino]-4'-[2-chloro-4 - (bis - β - hydroxyethyl - amino) - 1:3:5 - triazyl - (6)-amino]-stilbene-2:2'-disulphonic acid of the formula

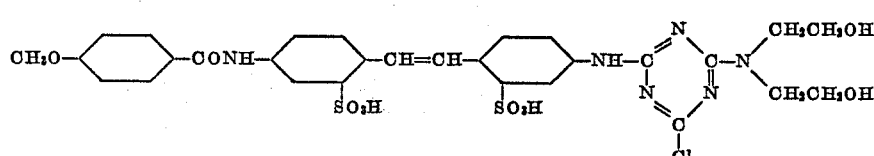
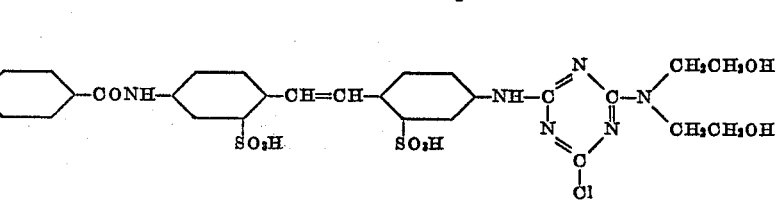

4. An optical bleaching agent which comprises an alkali salt of 4-[(para-methoxy-benzoyl)-amino]-4'-[2-phenoxy-4 - (β - hydroxyethylamino) - 1:3:5 - triazyl - (6) - amino]-stilbene-2:2'-disulfonic acid of the formula

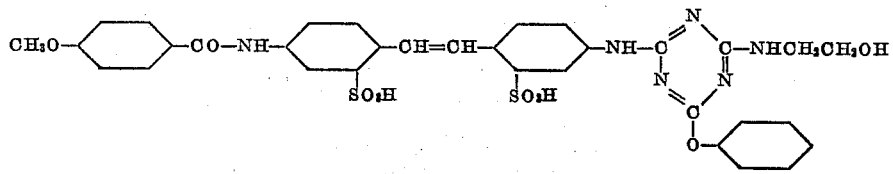

5. As an optical bleaching agent, a water-soluble salt of a substantially colorless derivative of 4:4'-diamino-stilbene-2:2'-disulfonic acid of the general formula

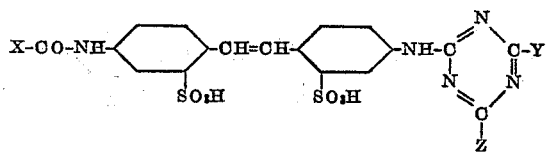

in which X represents a benzene nucleus which is free from alkoxy groups in the ortho position to the —CO— group and contains a lower alkoxy group in the para-position to said group, Y is a member selected from the group consisting of —NH₂, lower alkylamino, lower (hydroxyalkyl)-amino and monocyclic carbocyclic aryl-amino, the respective amino groups being attached to the triazine ring by the amino nitrogen atom, and Z is a member selected from the group consisting of —Cl, monocyclic carbocyclic aryloxy attached to the triazine ring by the aryloxy oxygen atom, monocyclic carbocyclic arylmercapto attached to the triazine ring by the arylmercapto sulfur atom, and radicals as defined by the symbol Y, and wherein each of X, Y and Z is free from groups which impart dyestuff characteristics to the compound.

6. As an optical bleaching agent, a water-soluble salt of a substantially colorless derivative of 4:4′-diamino-stilbene-2:2′-disulfonic acid of the general formula

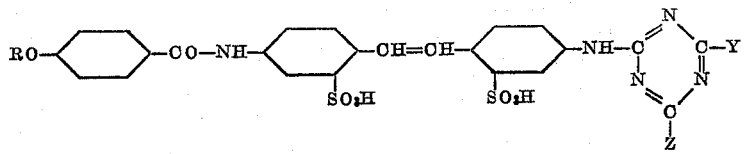

in which R represents a lower alkyl radical, Y represents lower(hydroxyalkyl)-amino attached to the triazine ring by the amino nitrogen atom, and Z represents monocyclic carbocyclic aryloxy attached to the triazine ring by the aryloxy oxygen atom, and wherein each of R, Y and Z is free from groups which impart dyestuff characteristics to the compound.

7. As an optical bleaching agent, a water-soluble salt of a substantially colorless derivative of 4:4′-diamino-stilbene-2:2′-disulfonic acid of the general formula

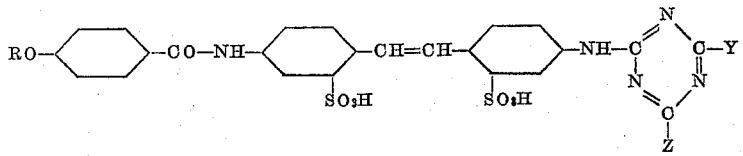

in which R represents a lower alkyl radical, Y represents lower(hydroxyalkyl)-amino and Z represents lower alkylamino, the respective amino groups being attached to the triazine ring by the amino nitrogen atom, and wherein each of R, Y and Z is free from groups which impart dyestuff characteristics to the compounds.

8. As an optical bleaching agent, a water-soluble salt of a substantially colorless derivative of 4:4′-diamino-stilbene-2:2′-disulfonic acid of the general formula

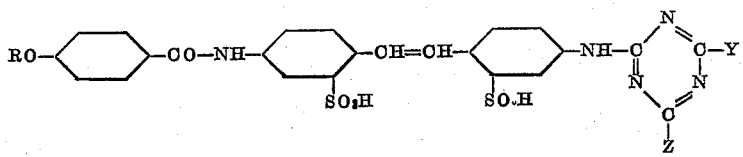

in which R represents a lower alkyl radical, Y represents lower alkylamino attached to the triazine ring by the amino nitrogen atom, and Z represents monocyclic carbocyclic arylamino attached to the triazine ring by the aryl-amino nitrogen atom, and wherein each of R, Y and Z is free from groups which impart dyestuff characteristics to the compound.

9. As an optical bleaching agent, an alkali salt of 4 - [(para - methoxy - benzoyl) - amino] - 4′ - [2 - (ortho-anisidino) - 4 - ethylamino - 1:3:5 - triazyl - (6) - amino]-stilbene-2:2′-disulfonic acid of the formula

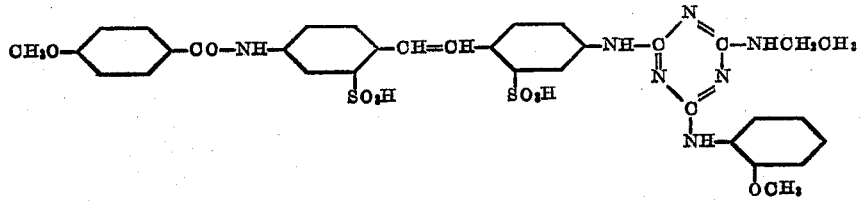

References Cited in the file of this patent
UNITED STATES PATENTS

| | | |
|---|---|---|
| 564,835 | Newman | July 28, 1896 |
| 2,171,427 | Eggert | Aug. 29, 1939 |
| 2,221,361 | Schmid | Nov. 12, 1940 |
| 2,368,844 | Keller | Feb. 6, 1945 |
| 2,376,743 | Wendt | May 22, 1945 |
| 2,473,475 | Keller | June 14, 1949 |
| 2,539,766 | Zweidler | Jan. 30, 1951 |